D. E. KEMPSTER.
ANTIFRICTION BEARING.
APPLICATION FILED SEPT. 10, 1908.

1,018,324.     Patented Feb. 20, 1912.

Witnesses
L. F. Darling
C. L. Ivory

Inventor
Daniel E. Kempster

UNITED STATES PATENT OFFICE.

DANIEL E. KEMPSTER, OF BOSTON, MASSACHUSETTS.

ANTIFRICTION-BEARING.

1,018,324.  Specification of Letters Patent.  Patented Feb. 20, 1912.

Application filed September 10, 1908. Serial No. 452,459.

*To all whom it may concern:*

Be it known that I, DANIEL E. KEMPSTER, a citizen of the United States, and resident of Boston, in the county of Suffolk and State of Massachusetts, have invented certain new and useful Improvements in Antifriction-Bearings, of which the following is a specification.

My invention relates to anti-frictional bearings in which rolls or rollers are interposed between the shaft or journal, or a sleeve thereon, and its hub or casing, and has for its object the production of an improved device of simple and inexpensive construction which can be used in sheaves for tackle-blocks, trolley-wheels, caster-wheels and like articles of large consumption and low cost. The device may also be employed in any and all classes of machinery wherever anti-frictional bearings are desirable and is applicable to heavy bearings as well as light and may be used on automobiles, car axles and the heaviest class of bearings.

In my invention I employ an outer shell, casing or hub made integral, having a circular bore and provided intermediate its ends with one or more annular grooves. Inside this bore I place one or more series of rolls, each roll having one or more annular grooves, forming journals thereon. The ends of said rolls are preferably made substantially flush with the ends of the hub or casing, thus giving a long bearing to the rolls and increasing their stability when in action. To properly space the rolls and keep them apart from each other to avoid contact between them and so that they will rotate with a minimum of friction, and also to retain said rolls assembled within the hub or casing when the shaft or journal is removed therefrom, and also to hold the rolls in proper position longitudinally with relation to the hub or casing, I provide a spider-ring having roll separating and retaining notches in its periphery for the journals of the rolls to rotate in, as is usual, and also having outwardly extending arms or portions which are adapted to loosely enter the annular groove in the hub or casing so as to permit the said spider-ring and its nest of rolls to freely revolve, but yet securely lock said rolls from endwise displacement during their operation.

My invention consists of the special construction and combination of parts, and in the method of arranging and applying said parts to produce the desired result, all of which I will now more particularly describe and point out in the claims.

Figure 1:
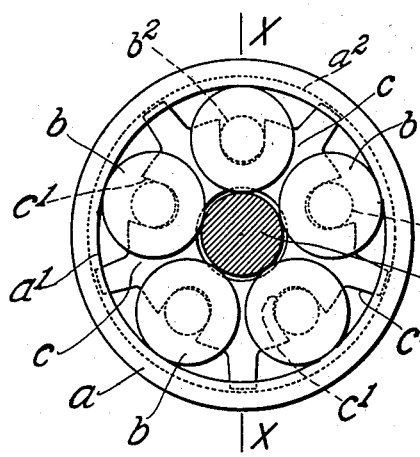
Figure 2:
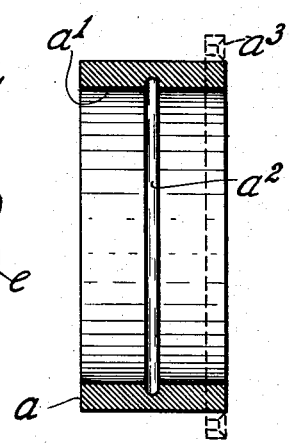
Figure 7:
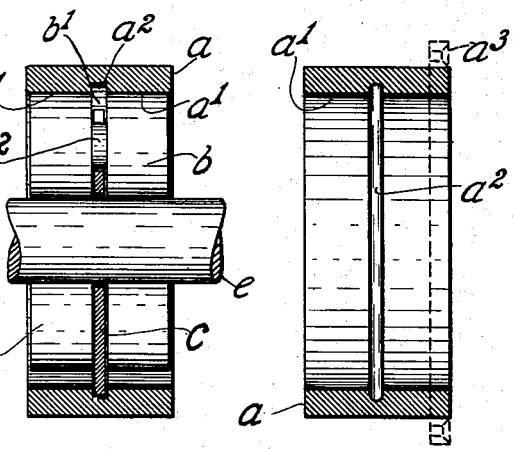
Figure 3:
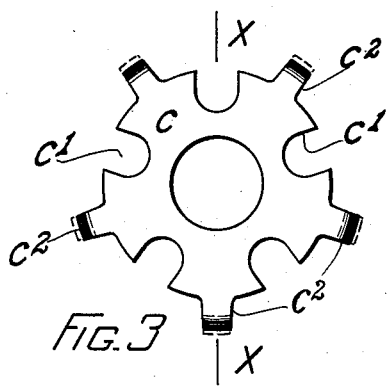
Figure 4:
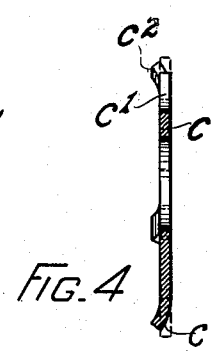
Figure 5:
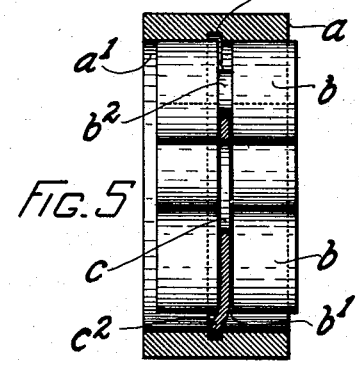
Figure 6:
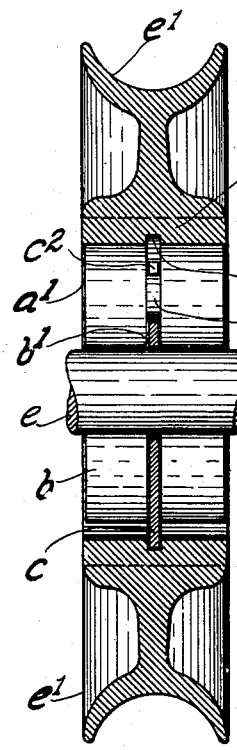
Figure 8:
Figures 9, 10:
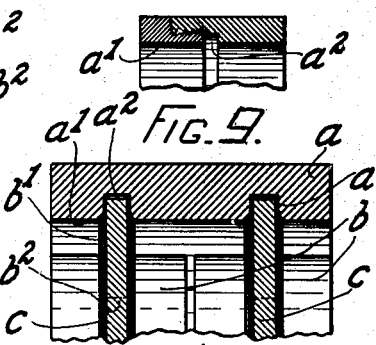

In the accompanying drawings, in which like reference-letters indicate like parts in all the views, Figure 1 is an end view of the assembled roller bearing with its shaft or journal shown in cross-section. Fig. 2 is a vertical section of the same on the line $x$—$x$ in Fig. 1, the rolls and journal being shown in elevation. Fig. 3 is a detail or face view of the roll-separating and retaining spider-ring. Fig. 4 is a vertical section of the same on the line $x$—$x$ in Fig. 3. Fig. 5 is a vertical section of the roller bearing showing the rolls and their separating and retaining spider-ring, partly inserted in its hub or casing. Fig. 6 is a central sectional view of a sheave and its roller bearing, the rolls and journal or pin being shown in elevation. Fig. 7 is a detail central sectional view of a bushing or casing for the roller bearing. Figs. 8, 9 and 10 are details of other forms of the device.

In Fig. 8 the hub or casing is shown as made in two parts or bushings, one bushing within the other and against a shoulder so as to form the annular groove therein, the two parts being secured together by one or more screws. In Fig. 9 the hub or casing is shown as a two-part shell secured together by a male and female screw thread thereon so as to leave the annular groove between them. It is of course obvious that the two-part shell might be divided longitudinally instead of circumferentially as shown, and be held together by any suitable means, in which case the annular groove would be formed in a similar manner as when the casing is made integral, but all of these different forms of construction are well known and expensive to make and it must readily be seen that with my improved construction and combination of parts the cost incident to the sectional construction is obviated and a strong, simple and inexpensive roller bearing is produced.

In Fig. 10 the hub or casing is shown as having two annular grooves, so as to use long rolls having an annular groove near each end, or, so as to be able to use two sets or series of shorter rolls therein, both styles of which are desirable in many cases where the ordinary bearing will not meet the requirements.

The above modification will be readily understood and appreciated without further illustration or description by those familiar with the art to which my invention appertains.

Referring to the drawings, $a$ represents an open-ended shell, hub or casing, made in one piece, as shown in Figs. 1, 2, 5, 6, and 7, having the interior cylindrical track $a^1$ separated by the substantially centrally arranged annular groove $a^2$, as shown. The hub or casing may, if desired be provided with a flange $a^3$, for attaching it to a wheel or other machine, as shown in dotted lines in Fig. 7. The anti-frictional rolls $b$, are distributed around the interior of the bushing or casing $a$, each roll having a substantially centrally arranged annular groove $b^1$, corresponding in width to the groove $a^2$, in the bushing or casing and forming the journals $b^2$. The anti-friction rolls $b$ are spaced and kept apart from frictional contact with each other, by the roll-retaining spider-ring or member $c$, which is provided with the notches $c^1$ in which the journals $b^2$ of the rolls revolve when in action. The roll-retaining spider-ring $c$ is also provided with arms or portions $c^2$, which extend outwardly beyond the cylindrical track $a^1$ of the bushing or casing $a$. The extreme diameter of the spider or roll-retaining ring $c$ being greater than the bore or internal diameter of the track $a^1$ of the bushing or casing, and so as to enter the annular groove $a^2$ of the bushing or casing and be free to revolve therein when the bearing is fully assembled or in use.

The spider or roll-retaining ring $c$ is preferably composed of tough pliable non-corrosive metal, such as nickel or bronze and may be formed by casting or punching out from a sheet of metal. I prefer to punch them from the flat sheet, and in the operation, if desired, by properly shaping the punch and die, the spider-arms or extending portion $c^2$, may be cupped, as shown in Figs. 3, 4 and 5 and thus reduce the extreme diameter of the spider-ring $c$ so that it will freely enter the bore of the bushing of casing $a$, as shown in Fig. 5. The operation of flattening the cupped portions or spider arms $c^2$ may be easily accomplished as will now be explained. The anti-frictional rolls $b$ are first placed, each in its respective notch $c^1$ in the spider-ring $c$ and the nest of rolls is then inserted into the bore of the bushing or casing $a$ with the cupped side of the spider-ring down, and with suitable pressure applied upon the upper end of the nest of rolls (preferably accomplished with a power press) the cupped ends of the arms or portion $c^2$ will bend and straighten out so as to enter and pass into the annular groove $a^2$ of the casing and by then reversing the hub or casing and applying a slight pressure to the opposite end of the nest of rolls the said spider-arms are fully adjusted and loosened up within the annular groove, thereby locking the nest of rolls in proper position longitudinally with relation to the casing and so that said nest of rolls and its retaining spider-ring can freely revolve within the casing, and the complete bearing is held intact thereby.

In practice I prefer to shape and slightly flare the annular groove in the shell or casing and also in the rolls substantially as shown in Figs. 7 and 10, as by so doing the shell is strengthened through the groove, and also, the flaring referred to permits the roll-separating and retaining spider-ring to adapt itself to more freely enter the annular groove.

It will of course be understood that the rolls are always assembled within the notches of the spider-ring before it is inserted into the bushing or casing and locked into the annular groove thereof.

I would state that in some cases it is preferable to dispense with primarily cupping the spider-ring, as the said spider-ring may be left perfectly flat and the rolls assembled in the notches thereof and the nest then placed upon the open end of the bushing or casing with the roller ends entering the same and pressure applied thereto, when the extending arms or portions $c^2$ of the spider-ring would be caused to bend until they will pass into the bore of the bushing or casing and when they reach the annular groove of the casing they will spring outwardly into the same, and by then reversing the bushing or casing and applying pressure to the opposite end of the nest of rolls, the spider-ring is caused to flatten out and expand into its original shape with the outwardly extending arms or portions fully locked into the annular groove of the casing as before described. It will thus be seen that the operation of assembling the parts and locking them together so that the roller bearing is held intact when the shaft or journal $e$ is removed therefrom is fully accomplished by the simple method employed and if at any time it is desirable to dismount the bearing for the purpose of removing the rolls, spider-ring or casing, it is as easily accomplished by simply applying sufficient pressure to the ends of the rolls to bend the spider-ring and force the nest of rolls out of its shell or casing.

In Figs. 3 and 4 the cupped roll-retaining spider-ring is shown in its flattened form by dotted lines in said views.

In Fig. 6 the sheave $e^1$ is shown as an ordinary web sheave having the hub $a$ in which the roller bearing is placed, the annular groove $a^2$ being formed in the hub of the sheave. If preferred the casing may be made as a separate bushing and be forced into the hub of the sheave as shown in dotted lines in said view, in which case the bushings can be made very cheaply from tubing having the proper internal and external diameters, it being only necessary to form the annular groove therein and sever the bushing from the tube the proper length required.

It will of course be understood that various changes can be made within the scope of mechanical skill without evading the essential spirit of my invention, as for instance, the number of spider-rings and rolls used in the bearing may be changed, as well as the exact shape of said parts, as the bore of the hub or casing might be irregular or tapering, instead of straight, and the rolls made to correspond therewith, also the exact contour of the spider-ring might be changed to better adapt it to perform its function or to conform to any changes made in the other parts, it being understood always, however, that the three essential elements of my invention are, an integral internally annularly-grooved hub or casing, annularly grooved rolls therein, and an integral exteriorly notched member which retains each roll in a spaced position circumferentially and also holds them longitudinally in position with relation to the casings and retains the complete bearing intact when the shaft or journal is removed therefrom. It should be understood that the shaft or journal might be encircled or incased with a sleeve and the rollers travel thereon instead of directly on the shaft or journal, this being well known and quite usual with anti-friction bearings, and furthermore, integral annularly grooved hubs or casings, and annularly grooved rolls and notched rings, are each of themselves old and well known, but I believe myself to be the first to construct, arrange and combine these devices substantially as herein shown and described.

It will thus be seen that in accordance with my invention I am enabled to produce at low cost a durable and thoroughly efficient anti-frictional bearing without a multiplicity of parts.

Having thus described my invention, what I claim, and desire to secure by Letters Patent, is:

1. An anti-friction bearing comprising a casing provided with an internal annular groove having a flared mouth, a series of rolls each provided with an annular groove, and a combined integral roll-supporting and retaining member provided with notches adapted to enter the grooves of the respective rolls and also provided with yieldable fingers fitting in the annular groove of the casing, said yieldable fingers permitting mounting and removal of the combined roll supporting and retaining member from the casing.

2. An anti-friction bearing comprising a one-piece or integral casing provided with an internal annular groove, a series of rolls each provided with an annular groove, and a combined integral roll-supporting and retaining member provided with notches adapted to enter the grooves of the respective rolls and also provided with yieldable fingers sprung into the annular groove of the casing.

3. An anti-friction bearing comprising a one-piece or integral casing having an internal annular groove, a series of grooved rolls, and a one-piece ring having notches to engage the grooves of the rolls and hold the latter against longitudinal displacement and also provided with radial yieldable fingers fitted in the annular groove of the casing.

4. An antifriction bearing comprising a hub having an internal groove, a series of rolls each being annularly grooved intermediate its ends, and a combined pliable roll support and retainer having working fit in the annular grooves of the rolls and fitted in the annular groove of the hub or casing, the combined roll support and retainer being removably mounted in the groove of the hub incident to the pliable material of which it is formed.

5. An anti-friction bearing comprising a one-piece or integral hub or casing having an internal annular groove, a series of rolls, each roll being annularly grooved intermediate its ends, mounted in the hub or casing, and a retaining member having coöperating connection with the journals of the rolls and provided with radial, substantially equi-distant fingers engaged in the groove of the hub or casing, the fingers being comparatively narrow.

6. An anti-friction bearing comprising a one-piece or integral hub or casing having an internal annular groove, a series of rolls mounted in the hub or casing, each roll having an annular groove intermediate its ends and an integral retaining member having coöperative connection with the grooves of the rolls and provided with radial fingers adapted to be sprung into the groove of the hub or casing, the diameter of the retaining member across its fingers being of greater length than the diameter of the bore of the hub or casing, said fingers being bendable so that the retainer may enter the hub or casing to permit the fingers to be sprung into said groove.

7. An anti-friction bearing comprising a one-piece or integral hub or casing having an internal groove, a series of rolls, each roll annularly grooved intermediate its ends and a combined roll support and retainer of greater width that the cross sectional diameter of the bore of the hub or casing and adapted to be sprung into the annular groove of the hub or casing, the combined roll support and retainer having working fit in the annular grooves of the rolls.

8. An anti-friction bearing comprising a one-piece or integral hub or casing having an internal groove, a series of rolls, each roll annularly grooved intermediate its ends and a combined roll support and retainer of greater width than the cross sectional diameter of the bore of the hub or casing and adapted to be sprung into the annular groove of the hub or casing, the inner corners of said groove being rounded to provide a flaring mouth to facilitate positioning of the combined roll support and retainer and to permit ready dismounting of the latter, the combined roll support and retainer having operative connection in the grooves of the rolls.

In testimony whereof I have affixed my signature, in presence of two witnesses.

DANIEL E. KEMPSTER.

Witnesses:
L. F. DARLING,
C. L. IVORY.